United States Patent [19]

Uemura et al.

[11] Patent Number: 4,761,234

[45] Date of Patent: Aug. 2, 1988

[54] INTERFACIALLY SYNTHESIZED REVERSE OSMOSIS MEMBRANE

[75] Inventors: Tadahiro Uemura, Kyoto; Yoshio Himeshima; Masaru Kurihara, both of Otsu, all of Japan

[73] Assignee: Toray Industries, Inc., Tokyo, Japan

[21] Appl. No.: 891,874

[22] Filed: Jul. 30, 1986

[30] Foreign Application Priority Data

Aug. 5, 1985 [JP] Japan ................................. 60-171249
Aug. 26, 1985 [JP] Japan ................................. 60-185903

[51] Int. Cl.$^4$ .............................................. E01D 13/00
[52] U.S. Cl. ............................. 210/500.38; 210/420; 210/475
[58] Field of Search ...................... 210/500.37, 500.38; 428/420, 475.2

[56] References Cited

U.S. PATENT DOCUMENTS

| | | | |
|---|---|---|---|
| 3,133,132 | 5/1964 | Loeb et al. | 264/49 |
| 3,133,137 | 5/1964 | Loeb et al. | 264/233 |
| 3,567,632 | 3/1971 | Richter et al. | 210/23 |
| 3,744,642 | 7/1973 | Scala et al. | 210/500 |
| 3,817,386 | 6/1974 | Frost et al. | 210/500.37 X |
| 3,878,109 | 4/1975 | Ikeda et al. | 210/500.37 X |
| 3,926,798 | 12/1975 | Cadotte | 210/23 |
| 3,951,815 | 4/1976 | Wrasidlo | 210/500 |
| 3,993,625 | 11/1976 | Kurihara et al. | 260/47 |
| 4,005,012 | 1/1977 | Wrasidlo | 210/23 |
| 4,039,440 | 8/1977 | Cadotte | 210/23 |
| 4,233,434 | 11/1980 | Kraus et al. | 210/500.38 X |
| 4,259,183 | 3/1981 | Cadotte | 210/654 |
| 4,277,344 | 7/1981 | Cadotte | 210/654 |
| 4,353,802 | 10/1982 | Hara et al. | 210/500.37 X |
| 4,366,062 | 12/1982 | Kurihara et al. | 210/651 |
| 4,387,024 | 6/1983 | Kurihara et al. | 210/490 |
| 4,454,176 | 6/1984 | Buckfelder et al. | 210/500.37 X |
| 4,557,949 | 12/1985 | Kurihara et al. | 427/244 |
| 4,559,139 | 12/1985 | Uemura et al. | 210/490 |
| 4,606,943 | 8/1986 | Rak et al. | 210/500.37 X |
| 4,661,254 | 4/1987 | Zupacici et al. | 210/490 |

FOREIGN PATENT DOCUMENTS

| | | |
|---|---|---|
| 0085111 | 10/1983 | European Pat. Off. . |
| 2211271 | 7/1974 | France . |
| 49-133282 | 12/1974 | Japan . |
| 5538164 | 3/1977 | Japan . |
| 5549524 | 10/1977 | Japan . |
| 55-37282 | 9/1980 | Japan . |
| 55-147106 | 11/1980 | Japan . |
| 56-3769 | 1/1981 | Japan . |
| 57-140607 | 8/1982 | Japan . |
| 58-24303 | 2/1983 | Japan . |
| 1462171 | 1/1977 | United Kingdom . |

OTHER PUBLICATIONS

Journal American Chemical Society 84 (1962) pp. 3782-3785, Office of Saline Water Research and Development Progress Report No. 359 (1968).
Journal of Applied Polymer Science, vol. 29 pp. 3369-3379, PEI Concentration Study MSI-400 Membrane.

*Primary Examiner*—Frank Sever
*Attorney, Agent, or Firm*—Austin R. Miller

[57] ABSTRACT

A semipermeable composite membrane comprising a microporous substrate and an ultra-thin membrane with which the substrate is coated, characterized in that the ultra-thin membrane is composed of a cross-linked aromatic polyamide and the cross-linked aromatic polyamide contains a tri- or higher functional aryl residue having at least two —NH groups. The semipermeable composite membrane has a high solute rejection, high and stable water flux and durability, and thereby may be applicable to various fields.

18 Claims, No Drawings

INTERFACIALLY SYNTHESIZED REVERSE OSMOSIS MEMBRANE

BACKGROUND OF THE INVENTION

1. Field of the Invention

This invention relates to a semipermeable membrane for separating ingredients of liquid mixture by selective permeation, and more specifically, it relates to a semipermeable composite membrane for the desalination of sea water, brackish water and selectively removing or recovering pollutant or useful materials from waste water causing public pollutions, for example, from dyeing process or from electrodepositing process, and thereby capable of contributing to the completeness of treatment of such waste water under a closed system.

2. Description of the Prior Art

Asymmetric membranes prepared from cellullose acetate are known as the semipermeable membranes utilized industrially, for example, so-called "Loeb" type of those membranes as disclosed in U.S. Pat. Nos. 3,133,132 and 1,133,137. However, these membranes are poor in the resistivity to hydrolysis, bacterial attack and chemicals. Particularly, if tried to improve their permeability, their pressure resistance and durability are sacrificed, and accordingly they have not yet been put into practical use for a wide range of application although employed in a restricted field.

Extensive studies have been made for investigating a new material free from the drawbacks of the asymmetric cellulose acetate membranes mainly in U.S.A. and Japan, and those materials partially improved the foregoing drawbacks have been obtained, such as aromatic polyamide, polyamide hydrazide (U.S. Pat. No. 3,567,632), polyamide acid (Japanese Patent Publication No. 55-37282, U.S. Pat. No. 3,878,109), cross-linked polyamide acid (Japanese patent Publication No. 56-3769), polyimidazopyrrolone, polysulfonamide, polybenzimidazole, polybenzimidazolone and polyarylene oxide. However, none of them is superior to the cellulose acetate membrane with respect to the selective separation characteristic or permeability.

On the other hand, composite membranes comprising ultra-thin membrane which is substantially responsible to membrane performances and a microporous substrate for supporting the ultra-thin membrane have been developed as different type of semipermeable membrane from the "Loeb" type. In such composite membrane, it is possible to select the most optimum materials to each of the ultra-thin membrane and microporous substrate according to the purposes, and this can increase the degree of freedom for membrane fabrications. Another advantage of those composite membranes is said that they can be stored under the dry state different from the "Loeb" type membranes which must be stored always in a wet condition.

These composite membranes are classified into two types, that is, those comprising an ultrathin membrane and a microporous substrate coated with the ultrathin membrane directly and those comprising an ultrathin membrane, a microporous substrate and a gel layer intermediating between them. Example of the former are described in U.S. Pat. Nos. 3,744,642 and 3,926,798, Japanese Patent Application Laid-Open No. 55-147106 (U.S. Pat. No. 4,227,344), U.S. Pat. Nos. 4,557,949 and 4,366,062 and Japanese Patent Application Laid-Open No. 58-24303, and examples of the latter are described in Japanese Patent Application Laid-Open No. 49-133282 (U.S. Pat. No. 4,039,440), Japanese Patent Publication Nos. 55-49524 (U.S. Pat. No. 3,951,815 and 55-38164 (U.S. Pat. No. 4,005,012), PB Report No. 80-182090 and U.S. Pat. Nos. 4,387,024 and 4,559,139.

Those prior semipermeable composite membranes mentioned above, however, can not satisfy all of the desired properties required to the membranes, such as high solute rejection against both organic and inorganic materials dissolved in water, high water flux rate, durability such as heat resistance, chemical resistance, pressure resistance, chlorine resistance and hydrogen peroxide resistance.

The reverse osmosis is generally expected to be applied to various fields, such as, desalination represented by the conversion of sea water or brackish water into portable water, concentration or recovery of valuable materials, production of ultrapure water and separation of organic liquid mixture. Accordingly, the desired specific properties required to the reverse osmosis membrane would vary multifariously depending on its use and application. The important properties among them are selective permeability (solute rejection: Rej (%), water flux: Flux ($m^3/m^2$.day)), durability (m-value relating to the change of flux with the lapse of time), pressure resistance, heat resistance, oxidation resistance, workable pH range, resistance to microorganism, durability for chemicals and solvent, storage stability, etc. The m-value mentioned above is represented by the formula $\log (Qt_2/Qt_1)/\log (t_2/t_1)$ where $t_1$ is an initial time and $t_2$ is a time after a predetermined period and $Qt_1$ and $QT_2$ represent the flux at the time $t_1$ and the time $t_2$, respectively.

However, no asymmetric nor semipermeable composite membranes fulfilling all of these requirements has been developed at present. For example, the prior composite reverse osmosis membrane having an ultrathin membrane of cross-linked polyamide is said to show significant reduction of the flux with the lapse of operation period. While the desirable m-value for practical use of the reverse osmosis membrane is usually around $-0.02$, which corresponds to about 20% reduction of the flux during the operation of three years, any reverse osmosis membrane which has the m-value far from the above can not be considered useful from the viewpoint of efficiency and economization, even though its initial characteristics and properties are excellent and acceptable.

While on the other hand, the practical level of the solute rejection against organic material is usually required to be higher than 90%, representatively, against neutral, basic and acidic molecules such as isopropyl alcohol, ethylenediamine and acetic acid, no reverse osmosis membrane capable of fulfilling this requirement has been developed.

In addition, although some of the prior reverse osmosis membranes made of polyamide or cross-linked polyamide had been considered as chlorine resistant, their water flux is, in fact, usually reduced by about 20 to 30% or more after they are brought into contact with chlorine (refer to Journal of Applied Polymer Science, Vol. 29, 3369 (1984)), and the loss of the rejection and increase in the flux rate occur in an unrecoverable manner possibly due to the decomposition of polyamide upon contact with chlorine for a long period of operation or at high chlorine concentration.

A practically attractive reverese osmosis membrane should have the salt rejection of 99% or higher and water flux of 0.8 m³/m².day or greater under the condition of the applied pressure of 56 kg/cm² and the feed saline water of 35,000 ppm in the case of sea water desalination, or the salt rejection of 99% or higher and water flux of 0.7 to 1.3 m³/m².day or greater under the conditions of the applied pressure of 15 to 30 kg/cm² and the feed saline water of 1500 ppm in the case of brackish water desalination, in addition to a small reduction of water flux with the lapse of operation period, an improved rejection against organic materials and an oxidation resistance. The reverse osmosis membranes having been developed so far can only partially satisfy these requirements, and accordingly are subjected to various restrictions when put into practical use.

The object of the invention is to provide a semipermeable composite membrane of which ultra-thin membrane is made of specific cross-linked aromatic polyamide, having superior hydrophilicity, and high cross-linking density to improve especially the solute rejection against both inorganic and organic materials and water flux as well as the mechanical durability of the ultra-thin membrane.

Other objects and advantages of the invention will be apparent from the descriptions hereinafter.

SUMMARY OF THE INVENTION

In accordance with the present invention, a semipermeable composite membrane comprising a microporous substrate and an ultra-thin membrane coated on the microporous substrate is provided, where in the ultra-thin layer is composed of a cross-linked aromatic polyamide and the cross-linked aromatic polyamide contains tri- or higher polyfunctional aryl residue having at least two —NH groups.

In addition, the invention further provides a process for producing a semipermeable composite membrane comprising a microporous substrate and an ultra-thin membrane of cross-linked aromatic polyamide with which the microporous substrate is coated, characterised in that the ultra-thin membrane is prepared by interfacial polycondensation of an aqueous solution containing aromatic amine having an average functionality higher than 2.05 and a solution containing aromatic acid chloride having an average functionality higher than 2.00 in organic solvent immiscible with an aqueous solution.

The ultra-thin membrane of the invention is usually composed of the cross-linked aromatic polyamide obtainable by the interfacial polycondensation, and the thickness thereof can optionally be selected within the range of 10 to 1,000 nm depending on the intended purpose.

The cross-linked aromatic polyamide according to the present invention is a cross-linked polymer mainly composed of substituted and/or unsubstituted aromatic rings and amide bonds connecting them. There are no particular restrictions for the kind and substituted position of substituent is of the aromatic ring. However, a carboxylic acid group and carboxylate group can not occupy the position directly adjacent to a carbonyl group of an amide bond.

The substituent include, for instance, lower alkyl group such as methyl and ethyl group, methoxy group, ethoxy group, sulfonic acid group, sulfonate group, carboxylic acid goup, carboxylate group, amino group, N-alkylamino group such as N-methylamino and N-dimethylamino, quaternary ammonium group, acyl group, hydroxyl group, halogen such as fluorine, chlorine, bromine and iodine and nitro group. Among the above the preferred substituents may be selected from the group of methoxy group, sulfonic acid group, carboxylic acid group, amino group, quaternary ammonium group and the like taking into consideration the more efficient separation capacity of the semipermeable membrane. Although the substituted position of the aromatic ring has no particular restriction as stated above with the exception of carboxylic acid and carboxylate groups, those positions less undergoing steric hindrance are preferable.

The preferred examples of aromatic ring constituting the cross-linked aromatic polyamide include, for example;

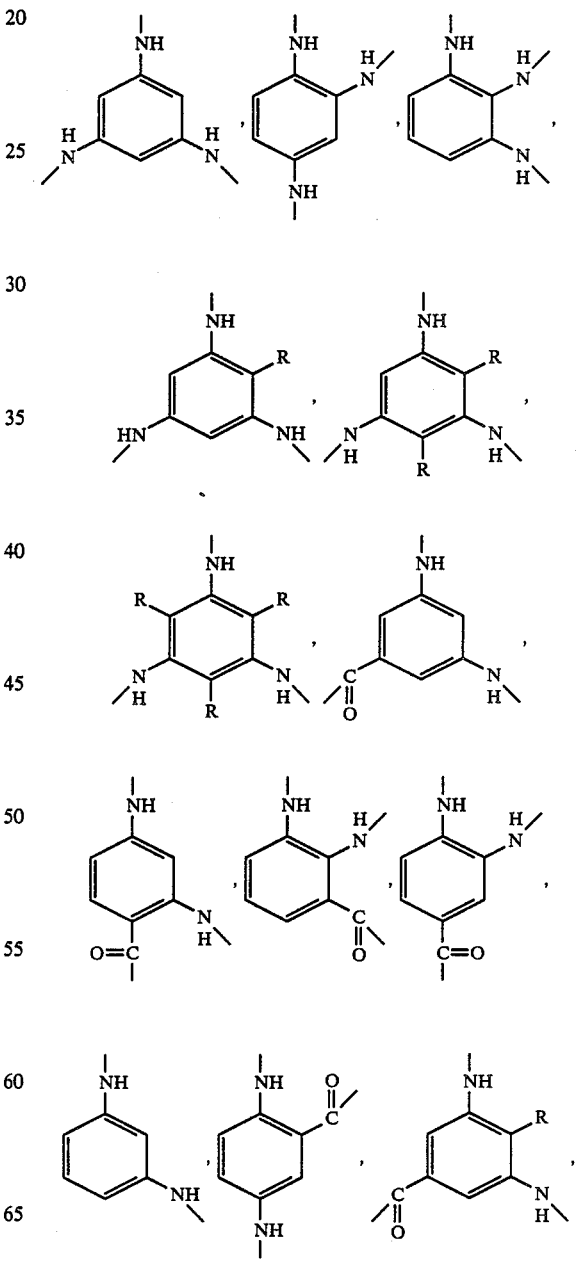

-continued
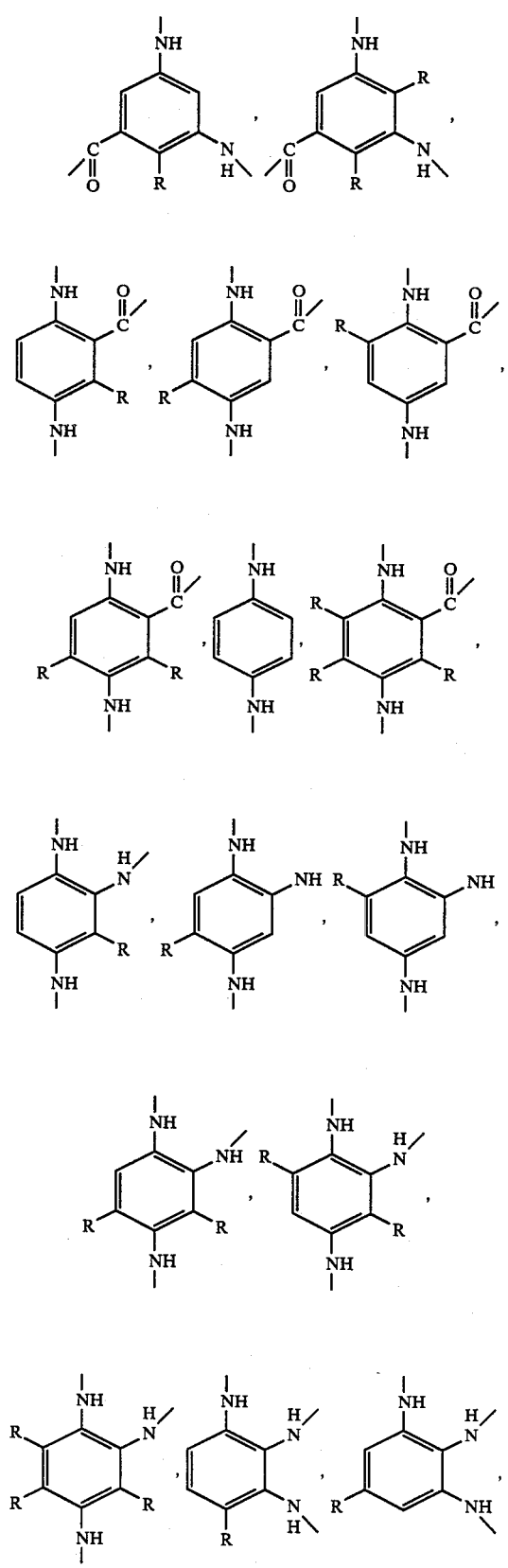
-continued
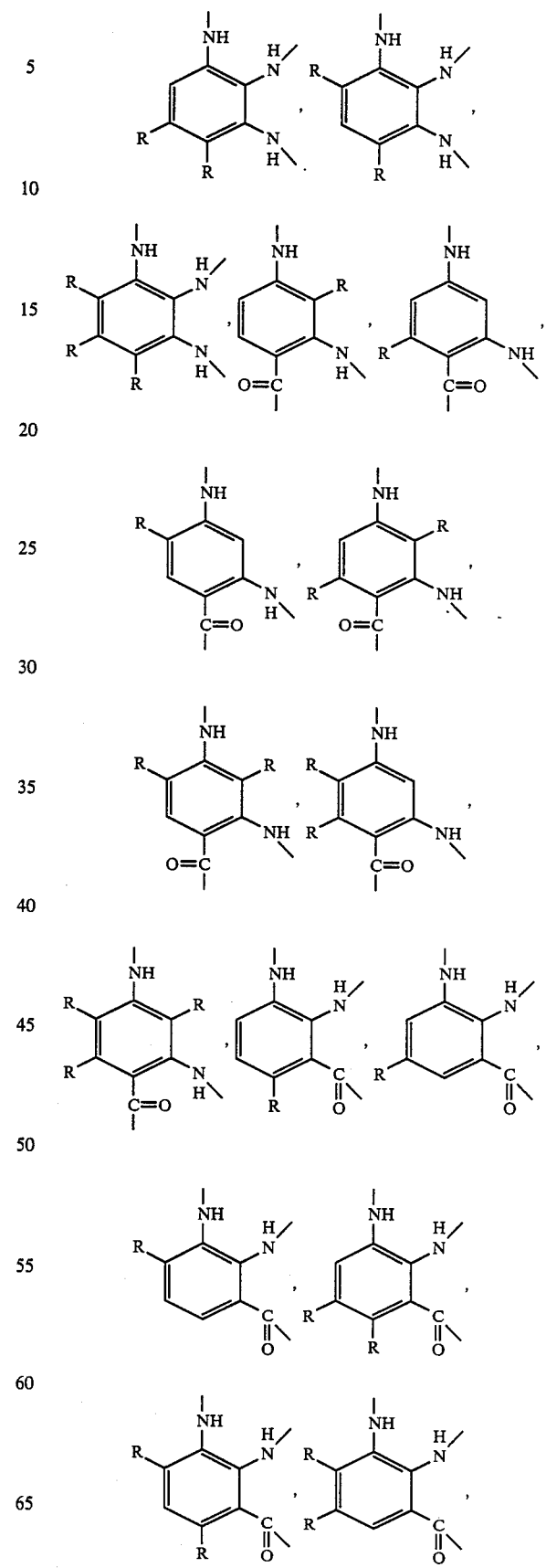

-continued

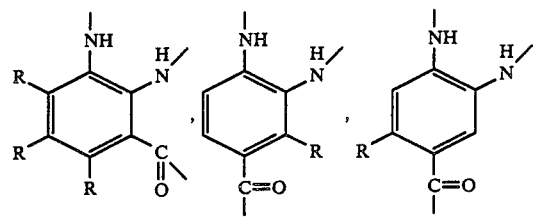

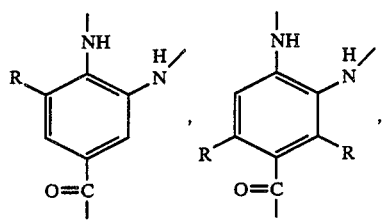

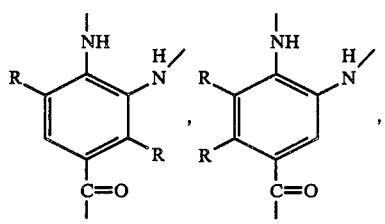

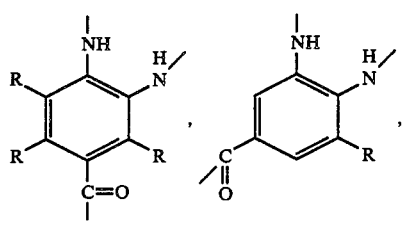

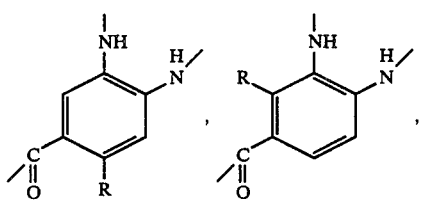

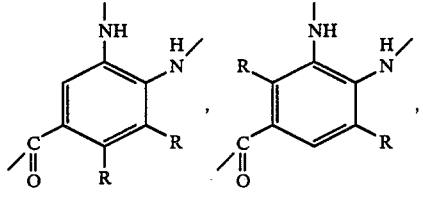

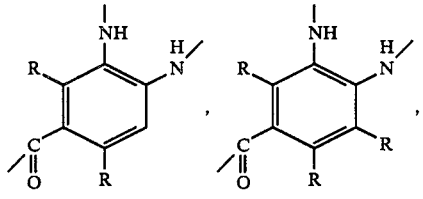

-continued

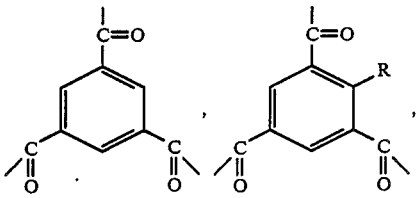

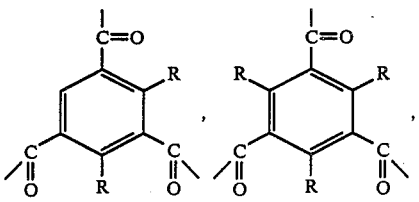

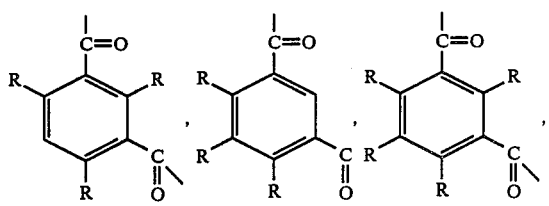

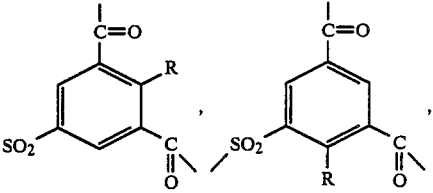

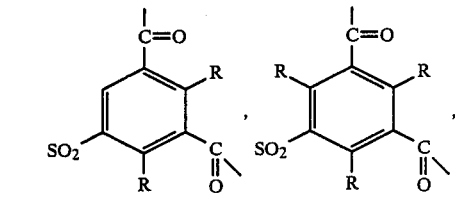

wherein R represents a substituent such as methoxy group, sulfonic acid group, carboxylic acid group (not adjacent to a carbonyl group), amino group and quaternary ammonium group. Those forming a covalent bond with a nitrogen atom (—NH—) substituted on the aromatic ring described above include hydrogen atom or carbonyl group to form a primary amino group and an amide bond connecting the aromatic rings, respectively. Those forming a covalent bond with a carbon atom (>C=O) include hydroxyl group or amino group to form a carboxylic acid group and an amide bond connecting the aromatic rings, respectively. In case of the formula

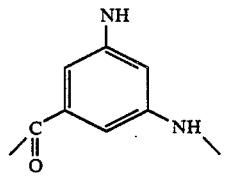

the carbon atom (>C=O) bonds with an amino group to form an amide bond. Those forming a covalent bond with a sulfur atom (—SO₂—) include a hydroxyl group and amino group to form a sulfonic acid group and a sulfonamide bond connecting aromatic rings, respectively.

From the overall point of view, for instance, the selectivity, water flux and oxidation resistance of the semipermeable composite membrane, the particularly preferred examples of aromatic ring constituting the ultra-thin membrane include;

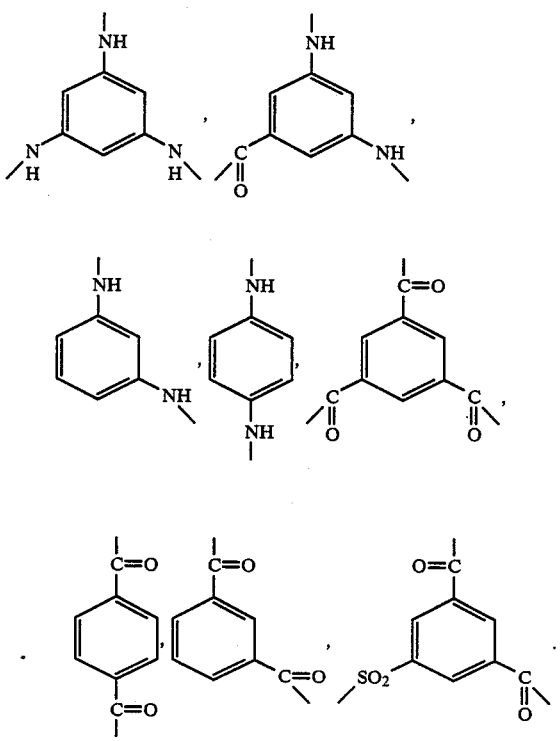

For providing high selectivity against organic materials, stable water flux, chlorine resistance, hydrogen peroxide resistance, and so on to the semipermeable composite membrane, it is preferable in the present invention that the cross-linked aromatic polyamide for the ultra-thin membrane contains one or both of trifunctional aryl residues represented by the formulae (I) and (II)

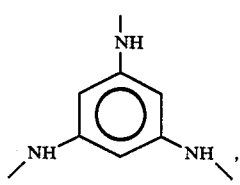 (I)

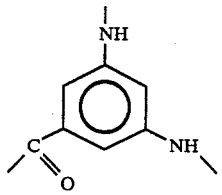 (II)

While the content of those trifunctional aryl residues is not particularly limited, those semipermeable composite membranes containing at least one of them by the amount of not less than 5% by weight based on the ultra-thin membrane are particularly preferred because they may possess such characteristics as an extremely high salt rejection, a solute rejection against organic materials and a less decrease of the flux rate due to the structural stability of the ultra-thin membrane with a high cross-linking density. Though the trifunctional aryl residue to be contained by not less than 5% by weight may be either the residue of the formula (I) or that of the formula (II), the optimum cross-linked aromatic polyamide most preferably contains the trifunctional aryl residue of the formula (I) at least 5% by weight as taking into the consideration the reverse osmosis performance.

The microporous substrate of the present invention is exemplified by a polysulfone microporous substrate reinforced with fabric mainly composed of at least one of polyester and aromatic polyamide.

The microporous substrate does not have substantial separation capacity, but serving for providing the strength to the ultra-thin membrane which has the substantial separation capacity. The substrate preferably has such structure as having uniform micro pores or those micro pores gradually enlarged from one surface to the other surface, with the size of the micro pores on one surface being smaller than about 100 nm. While the microporous support may be selected from various commercially available materials such as millipore filter (VSWP) or Toyo Filter Paper (UK10), it can usually be prepared according to the method described in "Office of Saline Water Research and Development Progress Report" No. 359 (1968). Homopolymer or the blended polymers of, such as, polysulfone, cellulose acetate, cellulose nitrate and polyvinyl chloride may be usually employed as the material. As one embodiment for preparing the microporous substrate, a microporous support having micro pores with the diameter of not greater than dozens nm on a main part of surface can be obtained by casting a solution of polysulfone in dimethyl formamide (DMF) to a predetermined thickness over a closely woven polyester fabric or non-woven fabric and then dipping in an aqueous solution containing 0.5% by weight of sodium dodecylsulfate and 2% by weight of DMF.

The aromatic amine, one reagent for preparing the cross-linked aromatic polyamide according to the invention, may be represented by the formulae (III) and (IV);

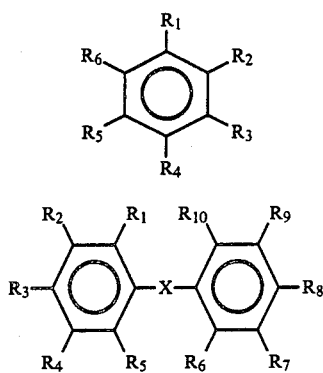

wherein $R_1$–$R_{10}$ represent a reactive amino group or other substituent.

The number of the amino groups in the compound of formula (III) is at least 2, and preferably 2 to 6, more preferably 2 or 3 for the convenience of handling. Other substituents than the amino group in the compound of the formula (III) may be any of substituents that do not hinder the formation of the cross-linked polyamide bridge, for instance, —H, —OCH$_3$, —CH$_3$, —C$_2$H$_5$, —C$_3$H$_7$, —SO$_3$H, —COOH, —NHCH$_3$, —OH,

—F, —Cl, —Br, and —I, provided that a carboxylic acid group and carboxylate group can not occupy the position directly adjacent to a carbonyl group of an amide bond in the polyamide. Hydrophilic substituents such as —H, —OCH$_3$, —COOH, —SO$_3$H and —OH are preferable to increase of water permeability.

The number of the reactive amino group in the compound of the formula (IV) is at least 2, and preferably 2 to 10 for the oxidation resistance of the semipermeable membrane, more preferably 2 to 7, and most preferably from 2 to 4 for the availability of the starting compound and the convenience of handling. Other substituents than the amino group in the compound of the formula (IV) may be any of substituents that do not hinder the formation of the cross-linked polyamide bridge, for instance, —H, —OCH$_3$, —CH$_3$, —C$_2$H$_5$, —C$_3$H$_7$, —SO$_3$H, —COOH, —NHCH$_3$, —OH, —COCH$_3$, —F, —Cl, —Br and —I, provided that a carboxylic acid group and carboxylate group can not occupy the position directly adjacent to a carbonyl group of an amide bond in the polyamide. Hydrophilic substituents such as —H, —OCH$_3$, —SO$_3$H, —COOH and —OH are preferable to increase of water permeability.

The symbol X in the formula (IV) means a single bond between two aromatic rings, or alternatively may be any of the divalent groups capable of bonding two aromatic rings, for instance, —NHCO—, —SO$_2$—, —S—, —COO—,

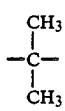

and —O—, preferably oxygen-containing groups such as —NHCO—, —SO$_2$—, —COO— and —O— for the interaction with water, and more preferably —O— and —NHCO— for the affinity with water. While the position of each substituent is not particularly restricted with the exception of carboxylic acid and carboxylate groups, those positions undergoing less steric hindrance are preferable for the separation capacity.

In view of the selectivity, permeability, durability and the like of the semipermeable composite membrane according to the present invention, the aromatic amine preferably contains not less than 5% by weight of at least one of aromatic amines represented by the following formulae;

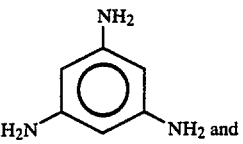

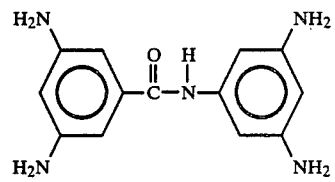

and most preferably contains not less than 5% by weight of the aromatic amine of the formula

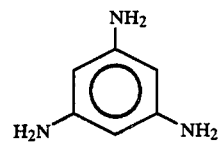

for the overall point of view on the separation capacity, chlorine resistance, hydrogen peroxide resistance and change of flux rate with the lapse of time.

The aromatic acid halide, the other reagent for preparing the cross-linked aromatic polyamide according to the invention, may be represented by the formulae (V) and (VI);

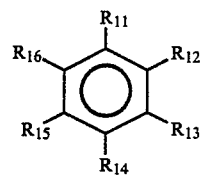

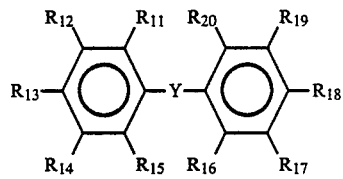

wherein $R_{11}$–$R_{20}$ represent a reactive acyl halide group or other substituent.

The number of the acyl halide groups in the compound of the formula (V) is at least 2, and preferably 2 to 6, more preferably 2 or 3 for the convenience of handling. Other substituents than the acyl halide group in the compound of the formula (V) may be any of substituents that do not hinder the formation of the cross-linked polyamide, for instance, —H, —OCH$_3$, —CH$_3$, —C$_2$H$_5$, —C$_3$H$_7$, —COCH$_3$, —F, —Cl, —Br and —I, provided that a carboxylic acid group and carboxylate group can not occupy the position directly adjacent to a carbonyl group of an amide bond in the polyamide. Hydrophilic substituents such as —H and —OCH$_3$ are preferable for the increase of water permeability.

The number of the acyl halide groups in the compound of the formula (VI) is at least 2, and preferably 2 to 7 for the oxidation resistance of the semipermeable membrane, and more preferably from 2 to 4 for the availability of the starting compound and the convenience of handling. Other substituents than the acyl halide group in the compound of the formula (VI) may be any of substituents that do not hinder the formation of the cross-linked polyamide, for instance, —H, —OCH$_3$, —CH$_3$, —C$_2$H$_5$, —C$_3$H$_7$, —COCH$_3$, —F, —Cl, —Br and —I, provided that a carboxylic acid group and carboxylate group can not occupy the position directly adjacent to a carbonyl group of an amide bond in the polyamide. Hydrophilic substituents such as —H and —OCH$_3$ are preferable for the increase of water permeability.

The symbol Y in the formula (VI) means a single bond between two aromatic rings, or alternatively may be any of the divalent groups capable of bonding two aromatic rings, for example, —NHCO—, —SO$_2$—, —S—, —COO—, —C(CH$_3$)$_2$— and —O—, preferably oxygen-containing groups such as —NHCO—, —SO$_2$—, —COO— and —O— for the interaction with water, and more preferably —O— and —NHCO— for the affinity with water. While the position of each substituent in the formula (V) or (VI) is not particularly restricted with the exception of carboxylic acid and carboxylate groups, those positions undergoing less steric hindrance are preferable for the separation capacity.

Preferable examples of the acid halide of the invention include

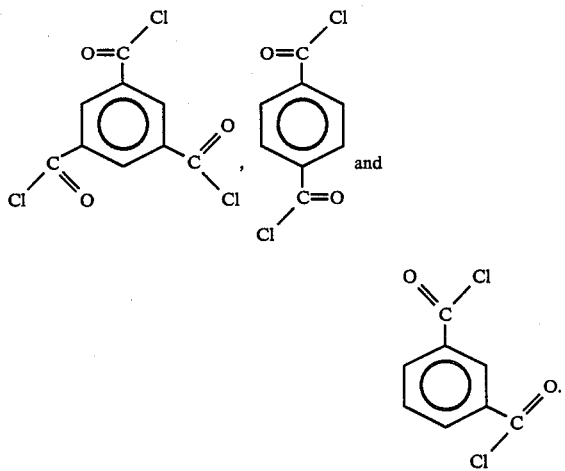

By the term "average functionality" of the aromatic amine in the present invention, it means the total number of the amino groups divided with the number of molecules in the aromatic amines comprising one or more of aromatic amines having two or higher functionality. On the other hand, by the term "average functionality" of the aromatic acid halide in the present invention, it means the total number of the acyl halide groups divided with the number of molecules in the aromatic acid halide comprising one or more of aromatic acid halide having two or higher functionality.

The average functionality of the aromatic amine thus defined may be 2.05 or more, and particularly preferable between 2.05 and 3.00 for enhancing the membrane performance and stability of the semipermeable composite membrane. The average functionality of the aromatic acid halide may be 2.00 or more, and preferably from 2.00 to 3.00 for the membrane performance.

The employable organic solvent in the present invention may be any one of those which are immiscible with water, can dissolve the acid halide, does not destroy the microporous substrate, and can form the cross-linked aromatic polyamide by the interfacial polycondensation.

Preferable examples of the solvent include hydrocarbons, cyclohexane and trifluorotrichloroethane, more preferably, at least one of n-hexane and trifluorotrichloroethane for the reaction rate and volatility of solvent, and most preferably trifluorotrichloroethane for further considering the safety with respect to inflammability.

The present invention is further illustrated by referring to specific examples described hereinafter, but in no way limited to them. It shold be understood that the spirit and scope of the invention is defined by the appended claims.

The following examples show the characteristics of composite reverse osmosis membrane prepared from at least one of 1,3,5-triaminobenzene, 3,3',5,5'-tetraaminobenzanilide and 2,3',4,5'-tetraaminobenzanilide as the amine moiety and at least one of trimesic chloride and terephthalic chloride as the acid chloride moiety.

As the selective separation capacity, the sodium chloride rejection is determined by the measurement of electroconductivity, and the rejection against organic compounds is determined by the analysis by the total organic carbon.

As the permeation characteristic, the water flux per unit area and per unit time is determined.

EXAMPLE 1

Preparation of 1,3,5-triaminobenzene 5-nitro-m-phenylenediamine (100.0 g) was dissolved in acetone (100 ml) and insolubles were filtered off by means of suction. 15.0 g of activated carbon was added into the solution, after stirring for 5 minutes it was removed by suction filtration. The solution was concentrated till crystals were slightly deposited, and 200 ml of water was added. The precipitated solids were filtered by means of suction, and dried under a reduced pressure to obtain 68.5 g of purified 5-nitro-m-phenylenediamine. The purified 5-nitro-m-phenylenediamine (55.0 g), platinum/carbon (5%) (1.06 g) and dioxane (580 ml) were placed in a tightly closed vessel and stirred at the rate of 851 rpm under a hydrogen pressure of 1 to 4 kg/cm$^2$ at 80° C. Hydrogen absorption was ceased within 25 minutes, and the mixture was stirred further one hour at 80° C. followed by left to cool. After filtering off the catalyst, the mixture was concentrated to 250 ml, then added with n-hexane (250 ml), and the white precipitate produced were filtered off. This white solid was washed with n-hexane and dried to obtain 1,3,5-triaminobenzene (39 g). The yield was 88%.

EXAMPLE 2

Preparation of 3,3',5,5'-tetraaminobenzanilide

While maintaining the inside of the reaction vessel in nitrogen atmosphere, 3,5-dinitroaniline (36.9 g) was dissolved in dehydrated tetrahydrofuran, to which triethylamine (26.4 g) was added. A solution of 3,5-dinitrobenzoyl chloride (51.0 g) in dehydrated tetrahydrofuran was added dropwise, then the reaction mixture was stirred at room temperature for 4 hours and further subjected to reflux for 4 hours. After filtering off the precipitates, the tetrahydrofuran in the reaction mixture was distilled off under the reduced pressure followed by added with methanol, and the precipitated powder was filtered and dried to obtain 52.7 g of white powder of 3,3',5,5'-tetranitrobenzanilide. The product of 3,3',5,5'-tetranitrobenzanilide (50.00 g) thus obtained, platinum/carbon (5%) (5.00 g) and dioxane (500 ml) were placed in a pressurized vessel and allowed to react under the hydrogen pressure of 2 to 4 kg/cm$^2$ at 80° C. for 3 hours. After cooling, the catalyst was removed by filtration and dioxane was distilled off under the reduced pressure to obtain yellow powder of 3,3',5,5'-tetraaminobenzanilide (34 g).

EXAMPLE 3

Preparation of 2',3,4',5-tetraaminobenzanilide 2,4-dinitroaniline (18.05 g), triethylamine (12.97 g) and benzene (750 ml) were placed in a reaction vessel and stirred under the nitrogen atmosphere. To the reaction mixture, 3,5-dinitrobenzoyl chloride (25.00 g) was added and refluxed under heating for 6 hours. The reaction mixture was filtered in hot state and the filtrate was cooled to deposit crystals of 2',3,4',5-tetranitrobenzanilide which was collected by filtration. The product of 2',3,4',5-tetranitrobenzanilide (3.00 g) thus obtained, platinum/carbon (5%) (0.18 g) and dioxane (85 ml) were placed in a pressurized vessel and allowed to react under the hydrogen pressure of 1 to 3 kg/cm$^2$ at 80° C. for 10 hours. After cooling, the catalyst was removed by filtration and dioxane was distilled off under the reduced pressure to obtain powder of 2',3,4',5-tetraaminobenzanilide.

EXAMPLE 4

Preparation of fiber-reinforced polysulfone substrate

A polyester woven fabric of taffeta (30 cm×20 cm, 160 μm in thickness, woven by multifilament of 150 deniers, warp density of 90/inch and woof density of 67/inch) was fixed on a glass plate, over which 15 wt% solution of polysulfone (Udel P-3500, manufactured by Union Carbide Co., Ltd.) in dimethylformamide (DMF) was cast in a thickness of 200 μm at room temperature (20° C.). Then it was immediately immersed into purified water and left for 5 minutes to obtain a fiber-reinforced polysulfone substrate, hereinafter referred to as FR-PS. The water permeation coefficient of FR-PS (210 to 215 μm in thickness) was 0.005 to 0.01 g/cm$^2$.sec.atm. under the pressure of 1 kg/cm$^2$ and at the temperature of 25° C.

EXAMPLE 5

The FR-PS obtained in Example 4 was immersed in a hot water at 90° C. for 2 minutes, and then cooled in water at room temperature.

The FR-PS was then immersed in aqueous solution containing 0.55% by weight of 1,3,5-triaminobenzene and 1.45% by weight of m-phenylenediamine (molar ratio=25:75) for 2 minutes. After removing the excess amount of the aqueous solution from the surface of the FR-PS, the surface was coated with a solution containing 0.5% by weight of trimesoyl chloride, 0.5% by weight of terephthaloyl chloride and 0.015% by weight of dimethylformamide in 1,1,2-trichloro-1,2,2-trifluoroethane so that the surface of the FR-PS was completely covered with the solution for 1 minute. After draining off the excess amount of the solution in a vertical position, the membrane was immersed in an aqueous solution containing 0.2% by weight of sodium carbonate for 5 minutes followed by washed with water.

The reverse osmosis performance of the semipermeable composite membrane thus obtained was evaluated under the following conditions.

Pressure: 15 kg/cm$^2$
Temperature: 25° C.
Feed: 1500 ppm NaCl

As a result, the salt rejection was 99.65% and the water flux was 0.90 m$^3$/m$^2$.day.

The thickness of the ultra-thin aromatic polyamide membrane was found to be from 30 to 800 nm with the average thickness of about 150 nm.

EXAMPLES 6, 7, 8 AND COMPARATIVE EXAMPLE 1

Membranes were prepared by repeating the same procedures as those of Example 5 excepting that amine and acid chloride listed in Table 1 below were used for the synthesis of the ultra-thin membrane according to the invention. The membrane performance of each membrane are shown in Table 1.

TABLE 1

| | 1,3,5-triaminobenzene/m-phenylenediamine (molar ratio) | Trimesoyl chloride/terephthaloyl chloride (molar ratio) | Average amine functionality | Average acid chloride functionality | Salt rejection (%) | Water flux (m$^3$/m$^2$ · day) |
|---|---|---|---|---|---|---|
| Example 6 | 1/3 | 7/3 | 2.25 | 2.70 | 99.61 | 1.02 |
| Example 7 | 1/3 | 1/0 | 2.25 | 3.00 | 99.50 | 0.84 |
| Example 8 | 1/1 | 1/1 | 2.50 | 2.50 | 99.45 | 0.85 |
| Comparative Example 1 | 0/1 | 1/1 | 2.00 | 2.50 | 99.20 | 0.75 |

EXAMPLE 9 AND COMPARATIVE EXAMPLE 2

The m-value representing the change of water flux of the semipermeable composite membrane obtained in Example 5 was measured (the m-value being formulated as log $(Qt_2/Qt_1)$/log $(t_2/t_1)$ wherein $t_1$ is the initial time, $t_2$ is a time after a predetermined period, and $Qt_1$ and $Qt_2$ are the flux rate at the times $t_1$ and $t_2$, respectively). As a result, the m-value at 1,000 hours was −0.011. In the same way, the membrane of Comparative Example 1 had the m-value of −0.04.

EXAMPLE 10

The membrane performance of the semipermeable composite membrane of Example 5 were measured after running of 100 hours under the same conditions as those of Example 5 excepting that chlorine was added to the feed water at the level of residual chlorine content of 10 ppm during the operation and pH was adjusted to 7.5. The salt rejection was 99.05% and the water flux was 0.83 m$^3$/m$^2$.day. After interrupting the addition of chlorine, by cleaning with trisodium phosphate at 500 ppm and then with phosphoric acid at 1,000 ppm, the salt rejection was recovered by 99.65% and the water flux to 1.08 m$^3$/m$^2$.day.

COMPARATIVE EXAMPLE 3

A composite membrane was prepared by the same procedures as those of Example 5 excepting that m-phenylenediamine as the starting amine and trimesoyl chloride as the starting acid chloride were used. As a result of the evaluation of the membrane thus obtained, the salt rejection was 98.5% and the water flux was 0.8 m$^3$/m$^2$.day.

EXAMPLE 11

The membrane performance of the membrane obtained in Example 5 against isopropyl alcohol was measured at the following conditions.
Pressure: 15 kg/cm$^2$
Temperature: 25° C.
Feed: 1000 ppm solute
The rejection was 96.8%.

COMPARATIVE EXAMPLE 4

The membrane performance of the membrane obtained in Comparative Example 3 was measured under the same conditions as those of Example 11. The rejection was 87.7%.

EXAMPLE 12

The membrane performance of the membrane obtained in Example 5 against ethylenediamine was measured under the same conditions as those of Example 11. The rejection was 95.5%.

COMPARATIVE EXAMPLE 5

The membrane performance of the membrane of Comparative Example 3 was measured against ethylenediamine under the same conditions as those of Example 11. The rejection was 93.3%.

EXAMPLE 13

The membrane performance of the membrane of Example 5 was measured against acetic acid under the same conditions as those of Example 11. The rejection was 50.0%.

COMPARATIVE EXAMPLE 6

The membrane performance of the membrane obtained in Comparative Example 3 was measured against acetic acid under the same conditions as those of Example 11. The rejection was 43.9%.

EXAMPLE 14

The FR-PS obtained in Example 4 was immersed in hot water at 90° C. for 5 minutes, and then cooled in water at a room temperature. Then, the FR-PS was immersed in an aqueous solution containing 1.00% by weight of 1,3,5-triaminobenzene and 1.00% by weight of m-phenylenediamine (molar ratio=47:53) for 2 minutes. After removing the excess amount of the aqueous solution from the surface of the FR-PS, it was coated with a solution of 0.05% by weight of trimesoyl chloride and 0.05% by weight of terephthaloyl chloride (molar ratio=43:57) in 1,1,2-trichloro-1,2,2-trifluoroethane so that the surface was completely covered for one minute. After draining off the excess amount of the solution in a vertical position, the surface of the membrane was coated with 1,1,2-trichloro-1,2,2-trifluoroethane so that the surface was completely covered for 30 seconds. Then, after draining the membrane in a vertical position, the membrane was dried at room temperature. The membrane performance of the composite membrane thus obtained was measured using 3.5% synthetic sea water with an osmotic pressure of 25 kg/cm$^2$ under the conditions of 56 kg/cm$^2$ and 25° C. As a result, the membrane performance was found to be 99.0% of rejection and 0.85 m$^3$/m$^2$.day of water flux.

EXAMPLES 15-17

Fresh FR-PS obtained in Example 4 was immersed for 2 minutes in an aqueous solution containing 2% by weight in total of 2,3',4,5'-tetraaminobenzanilide and m-phenylenediamine in a molar ratio shown in Table 2 below. After removing the excess aqueous solution, the surface of the membrane was coated with a solution of 0.063% by weight in total of trimesoyl chloride and terephthaloyl chloride in a molar ratio shown in Table 2 in trifluorotrichloroethane so that the surface was completely covered for about 30 seconds followed by draining. The membrane performance of the composite membrane thus produced was measured under the following conditions.
Pressure: 56 kg/cm$^2$
Temperature: 25° C.
Feed: 3.5% NaCl
The results are shown in Table 2.

TABLE 2

| | 2,3',4,5'-tetra-aminobenzanilide/m-phenylenediamine (molar ratio) | Trimesoyl chloride/terephthaloyl chloride (molar ratio) | Average amine functionality | Average acid chloride functionality | Salt rejection (%) | Water flux (m$^3$/m$^2$ · day) |
|---|---|---|---|---|---|---|
| Example 15 | 1/3 | 1/3 | 2.50 | 2.25 | 99.0 | 0.86 |
| Example 16 | 1/3 | 1/1 | 2.50 | 2.50 | 99.4 | 0.86 |
| Example 17 | 1/3 | 3/1 | 2.50 | 2.75 | 99.1 | 0.73 |

EXAMPLES 18-21

Fresh FR-PS obtained in Example 4 was immersed for 2 minutes in an aqueous solution containing 2% by weight in total of 3,3',5,5'-tetraaminobenzanilide and m-phenylenediamine in a molar ratio as shown in Table 3 below. After removing the excess aqueous solution, the surface was coated with a solution of 0.063% by weight in total of trimesoyl chloride and terephthaloyl chloride in a molar ratio shown in Table 3 in trifluorotrichloroethane so that the surface was completely covered for about 30 seconds followed by draining. The membrane performance was measured under the same procedure as Examples 15–17. The results are shown in Table 3.

hours. The salt rejection was 99.57% and the water flux was 0.95 $m^3/m^2$.day.

EXAMPLE 26

The FR-PS obtained in Example 4 was immersed in an aqueous solution of 2% by weight of 1,3,5-triaminobenzene for 2 minutes. After removing the excess aqueous solution from the surface of the FR-PS, the surface was coated with a solution of 0.025% by weight of terephthaloyl chloride dissolved in 1,1,2-trichloro-1,2,2-trifluoroethane so that the surface was completely covered for one minute. Then, in vertical position to drain off the excess solution, the surface was coated with 1,1,2-trichloro-1,2,2-trifluoroethane so that the surface was completely covered for 30 seconds and then in vertical position to drain off and dried under the room temperature. The resultant composite membrane was subjected to a reverse osmosis test using a liquid filtrate containing 0.5% by weight of the paint ingredient derived from the ultrafiltration of a cationic electrodepositing paint, under the conditions of 30 $kg/cm^2$ of pressure and 25° C. of temperature. The rejection against the paint ingredient was 99.7% and the water flux was 0.42 $m^3/m^2$.day.

TABLE 3

|  | 3,3',5,5'-tetraaminobenzanilide/m-phenylenediamine (molar ratio) | Trimesoyl chloride/terephthaloyl chloride (molar ratio) | Average amine functionality | Average acid chloride functionality | Salt rejection (%) | Water flux ($m^3/m^2$ · day) |
|---|---|---|---|---|---|---|
| Example 18 | 1/3 | 1/3 | 2.50 | 2.25 | 99.1 | 1.01 |
| Example 19 | 1/3 | 1/1 | 2.50 | 2.50 | 99.1 | 1.00 |
| Example 20 | 1/3 | 3/1 | 2.50 | 2.75 | 99.2 | 1.10 |
| Example 21 | 1/3 | 1/0 | 2.50 | 3.00 | 99.4 | 1.01 |

EXAMPLE 22

A semipermeable composite membrane was prepared under the same conditions as those of Example 5 except that the molar ratio of the acid chlorides was 4:6, the content of dimethylformamide was 0.008% by weight and the membrane was not immersed in the aqueous solution of sodium carbonate. Then, the membrane performance was measured under the following conditions.
Pressure: 30 $kg/cm^2$
Temperature: 25° C.
Feed: 1500 ppm NaCl
As a result, the salt rejection was 99.7% and the water flux was 1.40 $m^3/m^2$.day.

EXAMPLE 23

A composite membrane was prepared under the same conditions as those of Example 14 except that an FR-PS reinforced with poly(methaphenylene-isophthalamide) fibers was used and the surface was not washed with 1,1,2-trichloro-1,2,2-trifluoroethane after the cross-linking reaction. The membrane performance was measured under the same procedure as Example 14. As a result, the salt rejection was 98.9% and the water flux was 0.69 $m^3/m^2$.day.

After immersion of the membrane in an aqueous 1N—NaOH solution at 25° C. for 7 days, the membrane performance under the same conditions as described above showed 98.9% of the salt rejection and 0.68 $m^3/m^2$.day of the water flux.

EXAMPLE 24

The membrane characteristics of the semipermeable composite membrane of Example 5 were measured under the same conditions as those of Example 5 after immersing the membrane in an aqueous solution containing residual chlorine concentration of 1,000 ppm and of pH 10.3 under the room temperature for 18 hours. The salt rejection was 98.2% and the water flux was 2.70 $m^3/m^2$.day.

EXAMPLE 25

The membrane characteristics of the semipermeable composite membrane of Example 5 were measured under the same conditions as those of Example 5 after immersing the membrane in an aqueous solution of 2% hydrogen peroxide at the room temperature for 12

EXAMPLE 27

The composite membrane produced in Example 5 was cut into an appropriate size and immersed in methylene chloride to separate an ultra-thin membrane layer, which was then filtered off by means of suction using a glass filter.

The thus obtained sample of the ultra-thin layer (29 mg) was hydrolyzed with 12 ml of 6N hydrochloric acid solution at 180° C. After removing the insolubles, the hydrolysate was dried to be solidified. The weight of the solid was measured to be 25 mg. The solid was dissolved in a mixture of 2 ml of methyl alcohol and 10 ml of ethyl ether, to which diazomethane was bubbled to esterify by methylation. After distilling off the solvent under the reduced pressure, 2 ml of methyl acetate and 0.5 ml of trifluoroacetic acid anhydride were added and left for five minutes. After further distilling off the solvent under the reduced pressure, the residue was dissolved in 1 ml of methanol to be examined its composition by the GC-MS method.

As a result, molecular ion peaks and fragment ion peaks corresponding to trifluoroacetylated product of 1,3,5-triaminobenzene and m-phenylenediamine and methyl esters of trimesic acid and terephthalic acid were detected by mass spectroscopy.

According to the gas chromatographic analysis using internal standard method, the weight ratio of 1,3,5-triaminobenzene to m-phenylenediamine was about 0.5:1.5 and the weight ratio of trimesic acid to terephthalic acid was about 0.5:0.5.

As described in the foregoing examples, it can be understood the semipermeable composite membrane according to the present invention has a high solute rejection and high water flux, and is excellent in the m-value for maintaining the stable water flux and oxidation resistance such as chlorine resistance and hydrogen peroxide resistance which are important factors in view of the practical use and further applicable within a broad pH range.

It has, in addition, been confirmed that the composite semipermeable membrane of this invention may be subjected to a wide variety of application, for instance, from low pressure to high pressure operation, production of ultra-pure water, desalination of sea water, separation of inorganic salts and organic materials and, further, recovery of electrodepositing paints depending on the variation of composition thereof and the method of the preparation thereof.

What is claimed is:

1. A reverse osmosis membrane comprising a microporous substrate and an ultra-thin membrane with which the substrate is coated, characterized in that said ultra-thin membrane is composed of a cross-linked aromatic polyamide having a degree of cross-linking sufficiently high to provide a salt rejection of about at least 99% and water flux of at least 0.7–1.3 m 3/m 2.day under conditions of applied pressure of at least 15–56 Kg/cm 2 in the cases of brackish to sea water desalination, which is prepared by interfacial polycondensation of monomeric aromatic amine and monomeric aromatic acid halide and contains a tri- or higher functional aryl residue having at least two —NH— groups, and that the aryl residue does not have any carbonyl group as a substituent directly adjacent to a carbonyl group of a cross-linking amide bond.

2. A reverse osmosis membrane according to claim 1, wherein the tri- or higher functional aryl residue having at least two —NH— groups is at least one selected from aryl residues represented by the formulae I and II.

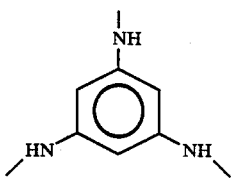

(I)

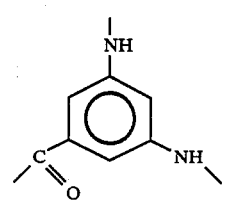

(II)

3. A reverse osmosis membrane according to claim 2, wherein one or both of the aryl residues represented by the formulae I and II contain not less than 5% by weight of the cross-linked aromatic polyamide.

4. A reverse osmosis membrane according to claim 1, wherein the cross-linked aromatic polyamide additionally contains at least one of the aryl residues represented by the formulae;

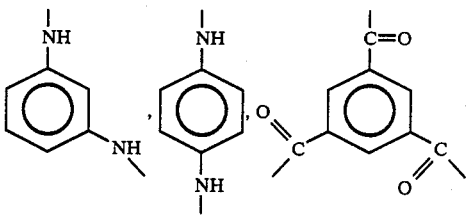

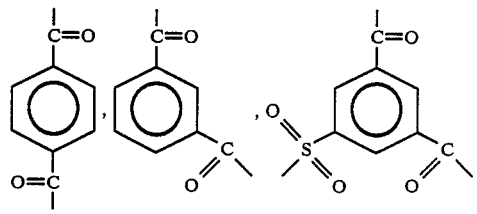

5. A reverse osmosis membrane according to claim 1, wherein the thickness of the ultra-thin membrane is in a range of from 10 to 100 nm.

6. A reverse osmosis membrane according to claim 1, wherein the microporous substrate comprises polysulfone.

7. A reverse osmosis membrane according to claim 1, wherein the microporous substrate is reinforced with a fabric selected from polyester and aromatic polyamide.

8. A reverse osmosis membrane according to claim 1, wherein the interfacial polycondensation is effected with an aqueous solution containing aromatic amines having an average functionality higher than 2.05 and a solution containing aromatic acid halides having an average functionality higher than 2.00 in an organic solvent immiscible with water.

9. A reverse osmosis membrane according to claim 8, wherein the average functionality of the aromatic amine is from 2.05 to 3.00.

10. A reverse osmosis membrane according to claim 8, wherein the average functionality of the aromatic acid halide is from 2.00 to 3.00.

11. A reverse osmosis membrane according to claim 8, wherein the average functionality of the aromatic amine is from 2.05 to 3.00 and the average functionality of the aromatic acid halide is of from 2.00 to 3.00.

12. A reverse osmosis membrane according to claim 8, wherein the aromatic amine contains at least one of the compounds represented by the following formulae;

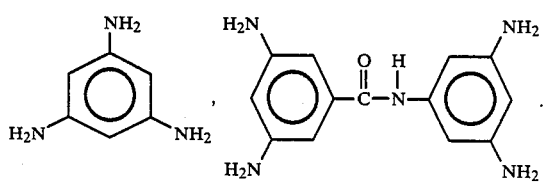

13. A reverse osmosis membrane according to claim 12, wherein the aromatic amine additionally contains at least one compound represented by the following formulae;

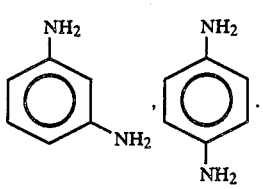

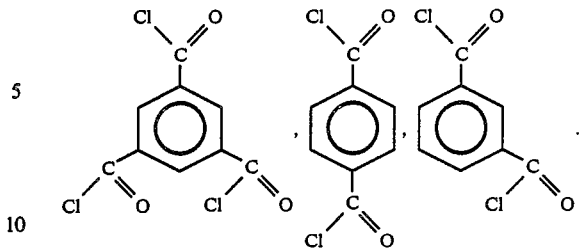

14. A reverse osmosis membrane according to claim 8, wherein the aromatic amine contains 1,3,5-triaminobenzene present in an amount of at least 5% by weight.

15. A reverse osmosis membrane according to claim 8, wherein the aromatic acid halide in the organic solvent contains at least one compound represented by the formulae;

16. A reverse osmosis membrane according to claim 8, wherein the organic solvent is selected from n-hexane and trifluorotrichloroethane.

17. A reverse osmosis membrane according to claim 8, wherein the solution of the organic solvent contains from 10 to 500 ppm of dimethylformamide.

18. A reverse osmosis membrane according to claim 8, which is further modified by being brought into contact with a chlorine-containing solution.

* * * * *

UNITED STATES PATENT AND TRADEMARK OFFICE
CERTIFICATE OF CORRECTION

PATENT NO. : 4,761,234
DATED : Aug. 2, 1988
INVENTOR(S) : Tadahiro Uemura, Kyoto; Yoshio Himeshima; Masaru Kurihara both of Otsu It is certified that error appears in the above-identified patent and that said Letters Patent is hereby corrected as shown below:

Column 2, line 31, correct "$QT_2$" to "$Qt_2$"

Column 14, lines 32-33, correct "trimesic chloride and terephthalic chloride to "trimesoyl chloride and terephthaloyl chloride"

Column 21, line 24, correct "m 3/m 2.day" to "$m^3/m^2$.day"

Column 21, line 26, correct "Kg/cm 2" to "kg/$cm^2$"

Signed and Sealed this

Fifth Day of September, 1989

Attest:

DONALD J. QUIGG

Attesting Officer

Commissioner of Patents and Trademarks